United States Patent
Excoffier et al.

(10) Patent No.: US 7,165,182 B2
(45) Date of Patent: Jan. 16, 2007

(54) MULTIPLE PASSWORD POLICIES IN A DIRECTORY SERVER SYSTEM

(75) Inventors: Karine Excoffier, Montbonnot Saint Martin (FR); Robert Bryne, Voiron (FR)

(73) Assignee: Sun Microsystems, Inc., Santa Clara, CA (US)

( * ) Notice: Subject to any disclaimer, the term of this patent is extended or adjusted under 35 U.S.C. 154(b) by 623 days.

(21) Appl. No.: 10/613,846

(22) Filed: Jul. 3, 2003

(65) Prior Publication Data
US 2004/0064742 A1    Apr. 1, 2004

(30) Foreign Application Priority Data
Jul. 5, 2002    (FR) .................................. 02 08489

(51) Int. Cl.
*G06F 1/24*    (2006.01)

(52) U.S. Cl. ............... 713/183; 713/184; 713/168; 713/182

(58) Field of Classification Search ............... 713/183, 713/184, 168, 182
See application file for complete search history.

(56) References Cited

U.S. PATENT DOCUMENTS

| | | | | |
|---|---|---|---|---|
| 5,987,608 | A | * | 11/1999 | Roskind ...................... 726/14 |
| 6,099,408 | A | * | 8/2000 | Schneier et al. ............... 463/29 |
| 6,195,694 | B1 | * | 2/2001 | Chen et al. .................. 709/220 |

* cited by examiner

*Primary Examiner*—Thomas R. Peeso
(74) *Attorney, Agent, or Firm*—Osha Liang LLP

(57) ABSTRACT

The invention proposes a directory server capable of interacting with entries organized in a tree structure in a directory server system. The entries comprise user entries. The directory server has a password checking function capable of checking the password for a user entry, based on password-related data. The password checking function is responsive to a user entry having extra data associated thereto, and identifying an additional entry, for executing a distinct password checking based on the password related data defined in that additional entry.

29 Claims, 9 Drawing Sheets

| Attribute Type<br>400 | Attribute Value<br>402 |
|---|---|
| dn : | uid=Joe, ou=people, dc=france, dc=sun, dc=com |
| objectClass : | top |
| objectClass : | person |
| objectClass : | organizationalPerson |
| objectClass : | inetOrgPerson |
| cn : | Joe |
| sn : | Rayan |
| uid : | joerayan |
| mail : | joerayan@sun.com |
| phoneNumber : | 778 |

ENTRY 404

| Role Type | Object Classes | Attributes |
|---|---|---|
| Managed role | nsSimpleRoleDefinition<br>nsManagedRoleDefinition | description (optional) |
| Filtered role | nsComplexRoleDefinition<br>nsFilteredRoleDefinition | NsRoleDN<br>description (optional) |
| Nested role | nsComplexRoleDefinition<br>nsNestedRoleDefinition | NsRoleDN<br>description (optional) |

FIG. 6
*(PRIOR ART)*

| CoS entries | Object Classes | Attributes |
|---|---|---|
| CoS definition entry | cosSuperDefinition<br>cosClassicDefiniton | cosTemplateDN<br>cosSpecifier<br>cosAttribute |
| CoS template entry | cosTemplate | <cosAttribute><br>cosPriority |

FIG. 7
*(PRIOR ART)*

MULTIPLE PASSWORD POLICIES IN A DIRECTORY SERVER SYSTEM

FIELD OF THE INVENTION

Embodiments of the present invention relate to distributed computer systems, and more particularly to password policies in a directory server system.

BACKGROUND OF THE INVENTION

In certain fields of technology, complete computer systems, including a diversity of equipments, are optimized for storing and retrieving data. Such systems may provide services to user machines related to a local network (e.g., an Intranet) or to a global network (e.g., the World Wide Web).

It is desirable that network users can access, upon a query, to a large number of data, making it possible for the network users to create their own dynamic web site or to consult a dynamic web site, for example an e-commerce site on a multi platform computer system (e.g., Solaris, Windows NT). These queries are directed to a directory (e.g., a light weight directory access protocol (LDAP) directory) and managed by a directory server. It is further desirable that this access to a large number of data be made possible more rapidly for each query arriving after a first query.

SUMMARY OF THE INVENTION

Embodiments of the present invention provide for password policy checking in a directory server system. The method provides a directory server system capable of assigning a specific password policy to a user or a set of users, so as to adjust the password mechanism controls to the user profile.

Broadly, there is proposed a method of implementing a password checking function based on password-related data in a directory server system. The directory server system has a directory server interacting with entries organized in a tree structure. The entries comprising user entries. The method comprises creating an additional entry, having attached password-related data. Extra data is attached to a given user entry, wherein the extra data designates the additional entry. Upon a call of the password checking function for the given entry, the password policy checking function is executed for the given user entry based on the password-related data in the additional entry designated by the extra data of the given user entry.

There is also proposed a directory server capable of interacting with entries organized in a tree structure in a directory server system. The entries comprise user entries. The directory server has a password checking function capable of checking the password for a user entry, based on password-related data. The password checking function is responsive to a user entry having extra data associated thereto, and identifying an additional entry, for executing a distinct password checking based on the password related data defined in that additional entry.

Embodiments of the present invention may also be defined as an apparatus or system, and/or as software code for implementing the method, or for use in the system, and/or as portions of such software code, in all their alternative embodiments to be described hereinafter.

BRIEF DESCRIPTION OF THE DRAWINGS

The present invention is illustrated by way of example and not by way of limitation, in the Figures of the accompanying drawings and in which like reference numerals refer to similar elements and in which:

FIG. 6 shows a block diagram of an exemplary set of role definitions, in accordance with one embodiment of the present invention.

FIG. 7 shows a block diagram of an exemplary schema, in accordance with one embodiment of the present invention.

Additionally, the detailed description is supplemented with the following Exhibits:

Exhibit E1 shows definitions of Password Policy attributes.

Exhibit E2 shows definitions of Lockout Password Policy attributes.

Exhibit E3 shows definitions of operational Password Policy attributes.

Exhibit E4 shows exemplary entry definitions for generating Password Policy attributes.

Exhibit E5 shows definitions related to PasswordPolicySubentry attribute.

In the foregoing description, references to the Exhibits are made directly by the Exhibit or Exhibit section identifier: for example, E2.1 refers to section 1 in exhibit 2. The Exhibits are placed apart for the purpose of clarifying the detailed description, and of enabling easier reference.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

As used herein, software entities imposes certain conventions in notation. Particularly, an expression indicated between the quote signs " " may be used to design LDIF extracts and an expression in italics may be used for representing an attribute and an object class.

As they may be cited in this specification, Sun, Sun Microsystems and Sun One are trademarks of Sun Microsystems, Inc. Furthermore, a portion of the disclosure of this patent document contains material that may be subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Figure 1:
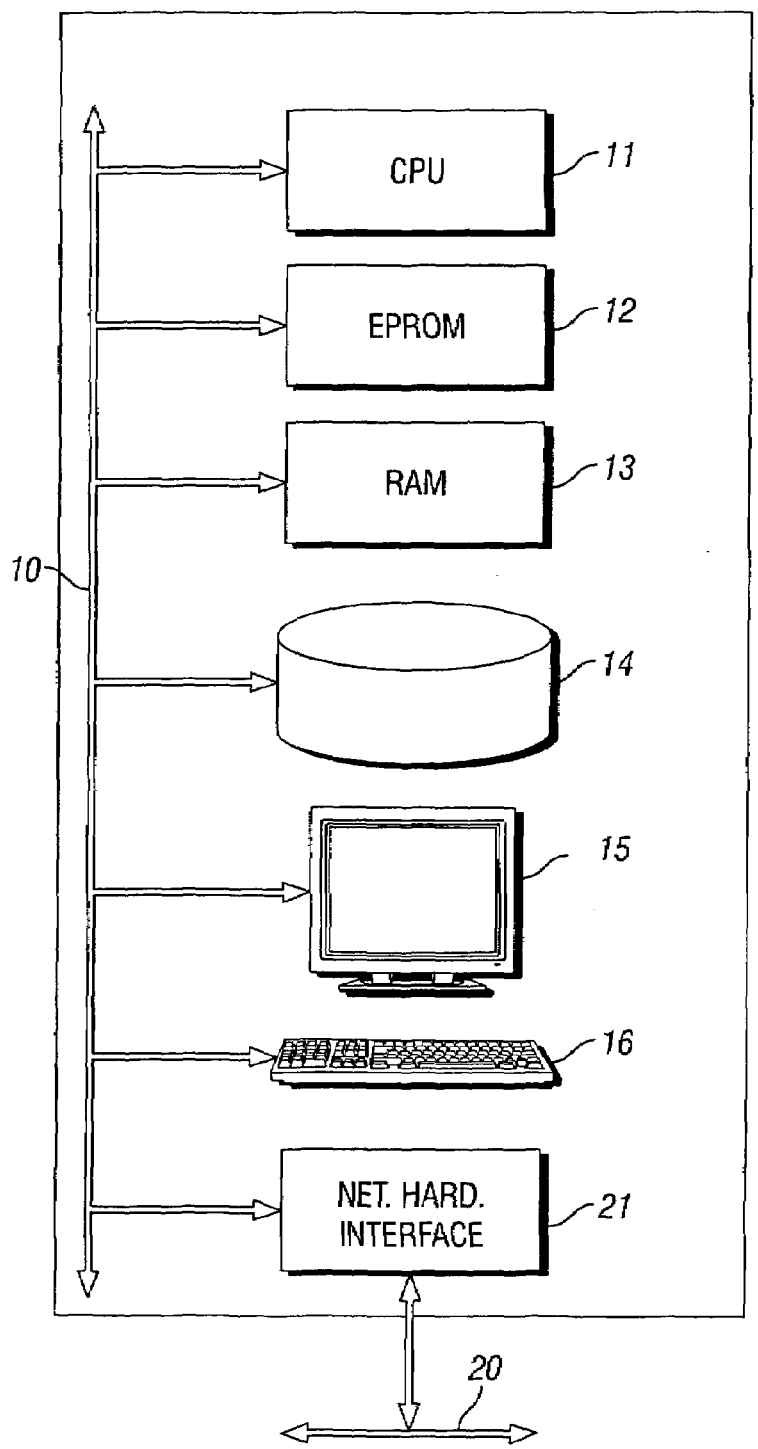
FIG. 1 shows a block diagram of an exemplary computer system for implementing embodiments of the present invention.

This invention may be implemented in a computer system, or in a network comprising a plurality of computer systems. Referring now to FIG. 1, a block diagram of an exemplary computer system for implementing embodiments of the present invention, is shown. As depicted in FIG. 1, a block diagram of an exemplary computer system comprises a processor 11, (e.g., an Ultra-Sparc) a program memory 12 (e.g., an EPROM, a RAM, or Flash memory), a working memory 13 (e.g. a RAM of any suitable technology), a mass memory 14 (e.g., one or more hard disks), a display 15 (e.g., a monitor), a user input device 15 (e.g., a keyboard and/or a mouse). The exemplary computer system further comprises a network interface device 21 connected to a communication medium 20, which is in communication with other computers. Network interface device 21 may be of the type of Ethernet, or of the type of ATM. Medium 20 may be based on wire cables, fiber optics, or radio-communications, for example. Data may be exchanged between the components of FIG. 1 through a bus system 10, represented as a single bus for simplification of the drawing. Bus systems may include a processor bus, e.g. PCI, connected via appropriate bridges to, e.g. an ISA or a SCSI bus.

The data exchanged is handled by a resource provider using a server to deliver data to user computers, or to store the data provided by the user computers. Browsers (e.g. Internet Explorer) are further provided on user computers, to enable users to make requests, to retrieve or store data. The resource provider makes it possible for user computers on a network to share data of any kind.

iPlanet E-commerce Solutions, now Sun One E-commerce Solutions, has developed a "netenabling" platform called the Internet Service Deployment Platform (ISDP). ISDP includes multiple, integrated layers of software that provide a full set of services supporting application development (e.g., business-to-business exchanges, communications and entertainment vehicles, and retail Web sites).

Sun One™ Directory Server, provides a centralized directory service for an intranet or an extranet. A directory service represents a collection of software, hardware, and processes that are able to deliver and store information. The directory service generally includes one or more directory client programs that can access the data stored in the directory, (e.g., names, phone numbers or addresses).

The Sun One Directory Server is a general-purpose directory that stores all information in a single, network-accessible repository. The Sun One Directory Server provides the standard protocol LDAP and an application programming interface (API) to access the information contained by the Sun One Directory Server.

LDAP is the Internet standard for directory lookups, just as the Simple Mail Transfer Protocol (SMTP) is the Internet Standard for delivering e-mail and the Hypertext Transfer Protocol (HTTP) is the Internet standard for delivering documents. Technically, LDAP is defined as on-the-wire bit protocol (similar to HTTP) that runs over Transmission Control Protocol/Internet Protocol (TCP/IP). It specifies the interaction between clients and servers and determines how LDAP queries and responses are carried over the IP network.

An LDAP-compliant directory, such as the Sun One Directory Server, leverages a single, master directory that contains all users, groups and access information. The directory is hierarchical, not relational and is particularly fitted for reading while offering a high reliability and a high scalability.

Figure 2:
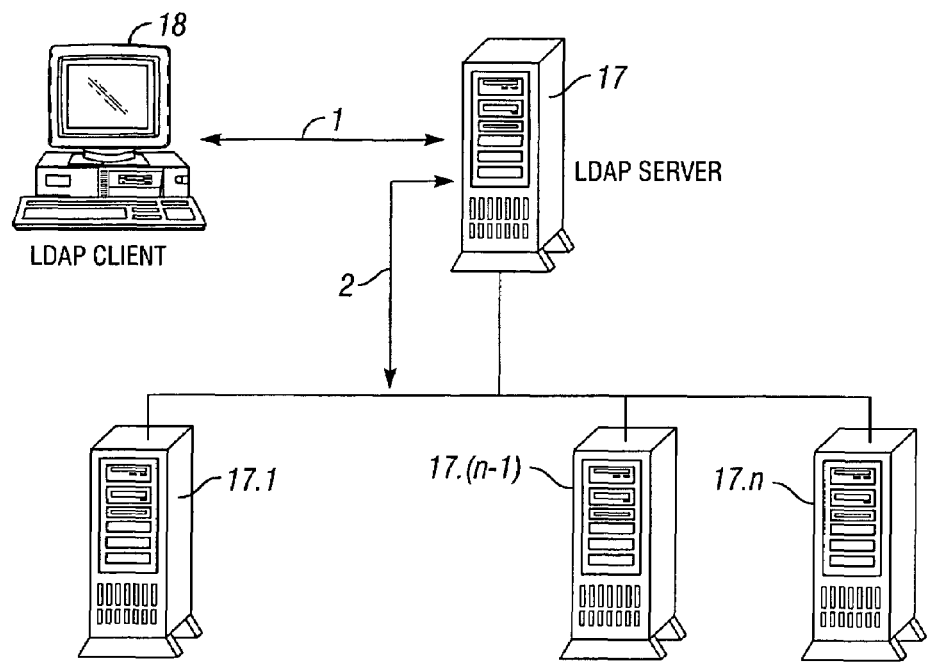
FIG. 2 shows a block diagram of an exemplary directory server system, in accordance with one embodiment of the present invention.

Referring now to FIG. 2, a block diagram of an exemplary directory server system, in accordance with one embodiment of the present invention, is shown. As depicted in FIG. 2, the directory server system comprises a director server 17 (e.g., LDAP server), one or more client devices 18, and one or more other servers 17.1 to 17.n. The LDAP defines a communication 1 between a server 17 and a client 18. LDAP also defines a communication 2 between LDAP server 17 and servers 17.1 to 17.n, which makes it possible for the server LDAP 17 to exchange its content (replication service) with servers 17.1 to 17.n or to access the directory of one of the servers 17.1 to 17.n (referral service) and vice versa.

The LDAP protocol is a message-oriented protocol. The client 18 constructs a LDAP message containing a request and sends the message to the server 17. The server 17 processes the request and sends a result, or results, back to the client 18 as a series of LDAP messages.

Such a client-server communication additionally lies on a specific architecture. LDAP creates a standard defining the way data is exchanged between the client computer and the directory server and defining the way data is modeled. More specifically, LDAP relies on four basic models: an information model, a naming model, a functional model, and a security model. The LDAP information model defines the kind of data that can be stored in a directory. LDAP directory is populated with entries. An entry corresponds to real-world objects, such as a person, a printer, or configuration parameters.

Figure 3:
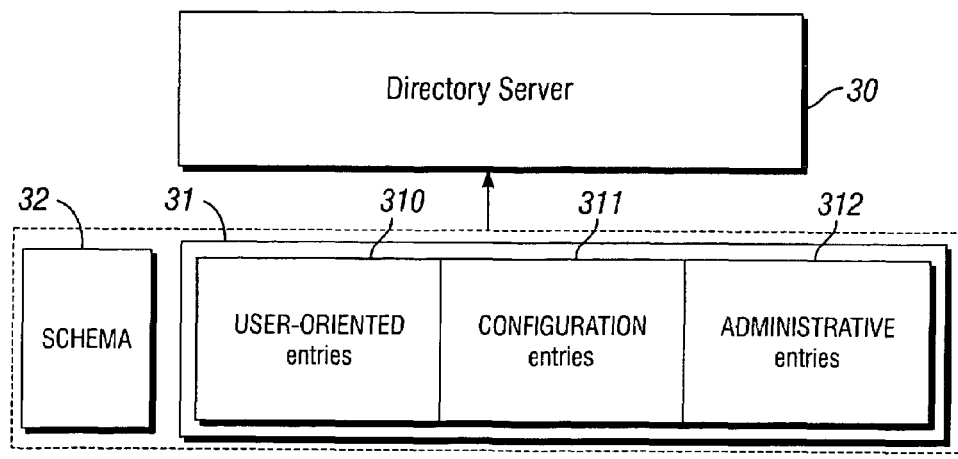
FIG. 3 shows a block diagram of an exemplary LDAP director, in accordance with one embodiment of the present invention.

Referring now to FIG. 3, a block diagram of an exemplary LDAP director, in accordance with one embodiment of the present invention, is shown. As depicted in FIG. 3, the directory server 30 executes implemented functions based on the entries 31 stored in databases. The entries comprise configuration entries 310, user-oriented entries 311 and administrative entries 312. These entries further interact with the schema 32 described below. The configuration entries 311 are stored under the subtree "cn=config". The user-oriented entries 311 comprise data related to the users of the directory server 30. Administrative entries 312 relate to user management and are generally implemented as LDAP subentries.

An entry contains a set of attributes associated with values. Each entry is uniquely identified by a distinguished name. The distinguished name may be stored in the dn attribute (distinguishedName).

Figures 4, 5:
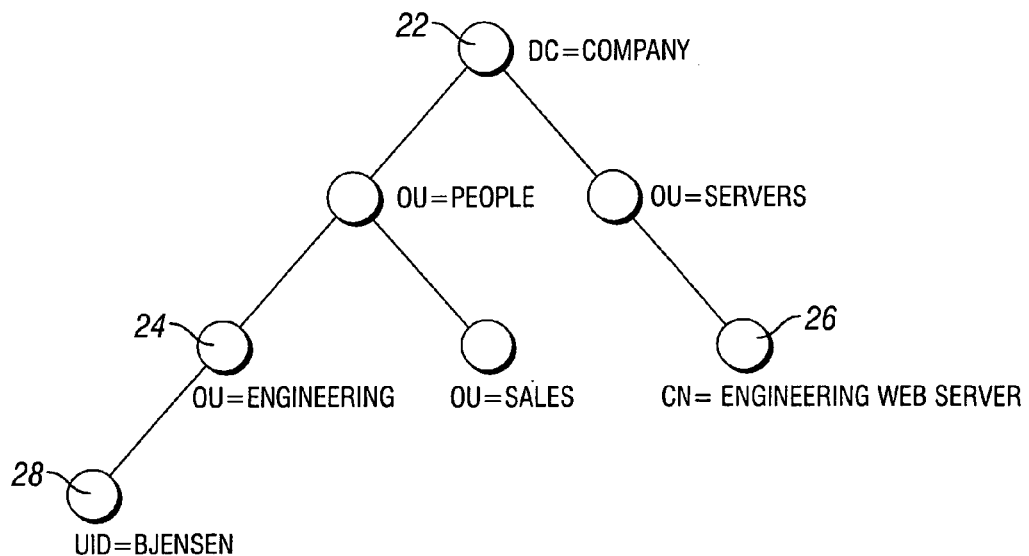
FIG. 4 shows a block diagram of an exemplary tree structure of the LDAP entries, in accordance with one embodiment of the present invention.
FIG. 5 shows an LDIF representation of an entry, in accordance with one embodiment of the present invention.

Referring now to FIG. 4, a block diagram of an exemplary tree structure of the LDAP entries, in accordance with one embodiment of the present invention, is shown. As depicted in FIG. 4, the LDAP entries are organized in a hierarchical tree structure, called the Directory Information Tree (DIT). Each node of the tree comprises an entry. More specifically, an organization entry (22) with the attribute type of domain component dc, an organizational unit entry (24) with the attribute type of organizational unit ou, a server application entry (26) with the attribute type of common name cn, and a person entry (28) with the attribute type of user ID uid. The entries are connected by the directory. Each server has a particular entry called root directory specific entry (rootDSE), which contains the description of the tree and of its content.

An LDAP Data Interchange Format (LDIF) is an ASCII text file format used to describe directory entries and operations on those entries. It enables creating, modifying, and deletion Directory entries and to import and export data among LDAP directories.

The information model is extensible, which means that new types of information can be added to a LDAP directory. Descriptive information is stored in the attributes of the entry. Each attribute describes a specific type of information. Attributes may have constraints that limit the type and length of data placed in attribute values. All entries require the objectclass attribute, which lists the object classes to which an entry belongs. An entry can belong to one or more object classes and must satisfy all of them. The objectclass attribute defines which attributes are required and which attributes are allowed in the entry.

Referring now to FIG. 5 is a LDIF representation of an entry 404, showing the attribute types 400 and their values 402. As depicted in FIG. 5, the entry (404) represented in LDIF belongs to the object classes top, person, organizationalPerson and inetOrgPerson.

Each attribute has a corresponding syntax definition. The syntax definition describes the type of information provided by the attribute. The object classes, the required and allowed attributes, and the syntax definition of the attributes are listed in the directory schema.

Referring again to FIG. 3, the LDAP directory comprises a structure 32 that defines object classes and attributes. This structure, called the schema, sets the rules defining what information can be stored in the LDAP directory and how information is organized. The schema specifies the required and allowed attributes that are used to store information and their syntax definition. A schema checking function may be activated, thus causing the directory server to check new entries to verify whether: object classes and attributes attached to new entries are defined in the schema 32, the attributes required for an object class according to the schema 32 are contained in an entry attached to that object class, and only attributes allowed by the object class according to the schema 32 are contained in an entry attached to that object class.

The LDAP naming model specifies that directory entries must be hierarchical and organized in an inverted tree structure. As mentioned above, each entry has a unique name called a distinguished name dn. The dn consists of a list of the names of all the parent entries in the directory back to the top of the directory hierarchy, the name of the entry being at the extreme left, e.g., "uid=Joe,ou=people, dc=france,dc=sun,dc=com", as shown in FIG. 5. The root of the entry is at the extreme right of the dn. The name at the extreme left of the dn, "uid=Joe" in the example, is the relative distinguished name or rdn. Within a set of entries sharing the same parents, the rdn must be unique. This ensures that two entries in the directory tree cannot have the same dn.

The LDAP functional model comprises eight basic functional operations (indicated thereinafter between the quote signs " ") that a user from a client computer can perform on the directory data of a LDAP directory server:

"bind" and "unbind": begin and end the exchange of information between LDAP clients and the directory server;

"add", "delete", and "modify": apply on specific entries in the DIT,

"compare": applies on two entries to compare their content according to criteria, "search": locates specific entries in the DIT, "modifyRDN": applies to change the distinguished name dn of an entry.

In addition to the eight basic functional operations, the LDAP protocol defines a framework for adding new operations to the protocol via LDAP extended operations. Extended operations allow the protocol to be extended in an orderly manner to meet new marketplace needs as they emerge.

According to another aspect of LDAP directories, entry grouping mechanisms are provided to simplify the management of LDAP users. Roles constitute one of those grouping mechanisms. A role may have members, which are the entries said to possess the role. Role mechanisms enable the following operations:

enumerating the members of a given role, determining whether a given entry possesses a particular role, and enumerating all the roles possessed by a given entry, It is further possible to assign a particular role to a given entry and to revoke a particular role from a given entry. Roles can also be associated with permissions, which allows a role-by-role access control management instead of a user-by-user access control management.

Every role is defined by its own definition entry. A role is uniquely identified by the distinguished name of its defining entry. Role definition entries are LDAP subentries and therefore inherit the subentry mechanism, defined in the ISO/IEC X.509 standard, for scoping.

Referring now to FIG. 6, a block diagram of an exemplary set of role definitions, in accordance with one embodiment of the present invention, is shown. As depicted in FIG. 6, a role can be of "managed" type 601, "filtered" type 602 or "nested" type 603. Each type of role further has two specific object classes 61 that inherit from the nsRoleDefinition object class.

Roles can be used with a Class of Service (CoS) to provide role-based attributes. To illustrate the CoS concept, we can consider a directory containing thousands of entries that all share the common attribute PostalCode. Traditionally, to change the postal code represented by the common attribute PostalCode, an individual update of each entry is required, which constitutes a heavy job for administrators. With CoS, the generation of the attribute PostalCode is dynamic. The PostalCode attribute is stored in one place, and each entry points to that place to give a value to their postal code attribute. For the application, the attributes generated by CoS appear just like all other attributes, despite that they are not actually stored on the entries themselves. When coupled with roles, a CoS makes it possible to generate or update an attribute or role-based attribute for all the entries possessing the role.

Figure 8:
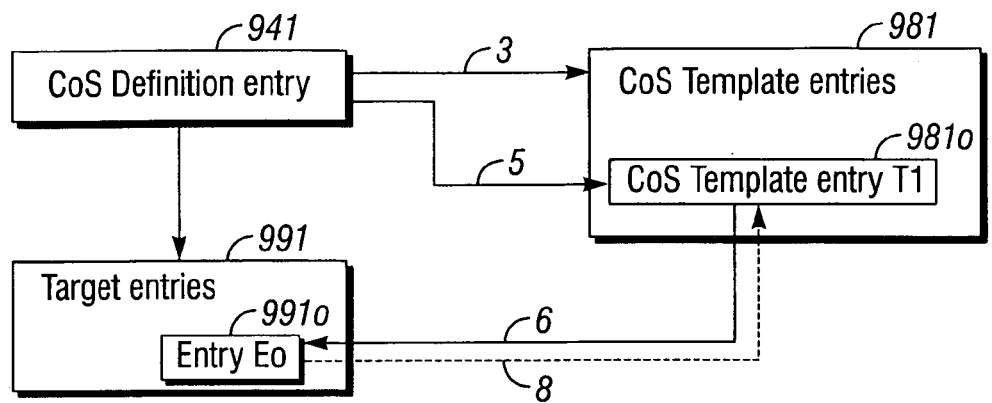
FIG. 8 shows a block diagram of an exemplary LDAP structure of a class of service, in accordance with one embodiment of the present invention.

Referring now to FIG. 8, a block diagram of an exemplary LDAP structure of a class of service, in accordance with one embodiment of the present invention, is shown. As depicted in FIG. 8, a class of service CoS is composed of the following entries in a LDAP directory:

a CoS Definition Entry 941 that identifies the type of CoS. It is stored as a LDAP subentry below the branch it affects. The CoS definition entry more specifically identifies a CoS Template entry of the tree structure and target entries.

a CoS template Entry 9810 that gives values to an attribute, identified by a cosAttribute in the CoS definition entry, the values being automatically generated in target entries 991.

Target entries 991 providing the attribute and attribute values dynamically generated by the CoS definition entry and the template entry. Target entries share the same parent as the CoS definition entry.

Different types of CoS can be used depending on the way the value of dynamic attributes need to be generated. There are three types of CoS:

A pointer CoS comprising a pointer cosTemplateDN identifies the template entry using the template distinguished name only (link 3).

An indirect CoS designating the template entry using the value of one of the target entry's attributes, identified by cosIndirectSpecifier attribute (link 8).

A classic CoS identifying the template entry by both its distinguished name designated by cosTemplateDN attribute (link 3) and the value of one of the target entry's attributes designated by cosSpecifier attribute (link 8).

Referring now to FIG. 7, a block diagram of an exemplary schema, in accordance with one embodiment of the present invention, is shown. As depicted in FIG. 7, the schema comprises a table representing the object classes 71 and the attributes 72 of a CoS definition entry 701 and of a CoS template entry 702 belonging to a classic CoS.

A CoS definition entry of a classic CoS belongs to the object classes cosSuperDefinition and cosClassicDefinition and comprises the attributes:

cosTemplateDN identifying the distinguished name of the parent entry of the cos template entry, cosSpecifier identifying the value of one of the target entry's attributes, and cosAttribute identifying the attribute to generate in the target entry based on the values of the template entry.

Figure 10:
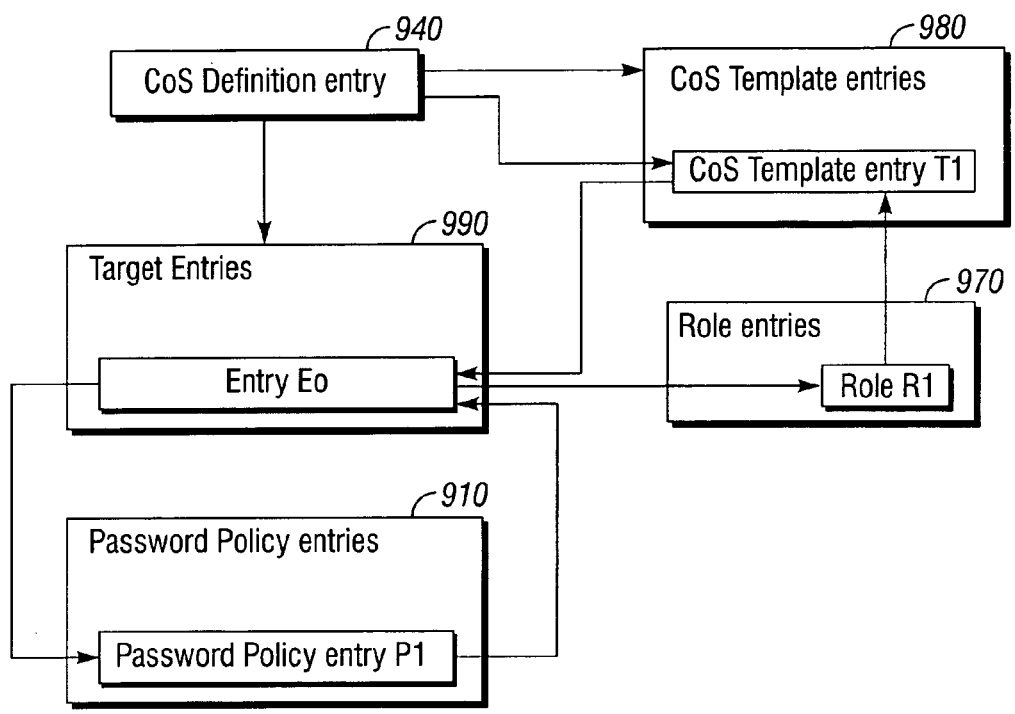
FIG. 10 shows a structure for generating role based-attributes, in accordance with one embodiment of the present invention.

A classic CoS is capable of generating attribute values for an entry based on the role possessed by the entry, which avoids generating the attribute values for each one of the entries of the role. Referring to FIG. 10, the structure for generating role based-attributes comprises a classic class of service having a CoS definition entry 940, CoS template entries 980 and Cos target entries 990, and role entries 970 interacting with the classic Class of Service.

A role-based attribute appears on an entry because the entry possesses a particular role associated with a template entry. The template entry generates the value of the attribute for all the entries that are members of that role. To update the role-based attribute on all the entries that are members of the role, one only needs to update the attribute in the template entry.

The LDAP security model further provides LDAP controls for additional information to be supplied by users as part of a LDAP operation. One example of a LDAP control is a password policy control. Password policies are used to make it difficult for password cracking programs to break into the directory. For instance, a password policy control can be used to return information during a bind request concerning the password expiration state of the user's password.

A password policy is a set of rules that define how passwords are used in a given system. The password policy mechanism provided by the directory server allows control of password parameters such as how short a password must be and whether users can reuse passwords. When users attempt to bind to the directory, the directory compares the password with the value in the password attribute of the user's directory entry to make sure they match. The directory server also uses the rules defined by the password policy to ensure that the password is valid before allowing the user to bind to the directory.

The LDAP password policies comprise control mechanisms, such as User-Defined Passwords, Password Change After Reset, Password Expiration, Expiration Warning, etc.

Password policies further comprise password policy attributes that set the parameters of passwords policies mechanisms. For instance, the password attribute passwordMaxFailure specifies the maximum of consecutive failed bind attempts after which a user account will be locked. Password policy attributes comprise the attributes that belong to the passwordPolicy object class defined in Exhibit E1, such as PasswordMustChange, PasswordChange, PasswordMinAge, PasswordExp, etc.

Referring again to FIG. 3, the schema 32 contains the definition of the passwordPolicy object class, as well as the definition of the password policy attributes. The passwordPolicy object class, contains a set of administrative password policy attributes.

Lockout password policy attributes are also defined in the schema. They prevent dictionary attacks against the password by counting the number of failed bind and locking the user's account. Exhibit E2 comprises the definition of lockout password policy attributes (PasswordLockout, PasswordMaxFailure and so on)

Operational password policy attributes are further defined in the schema 32. Exhibit E3 comprises the definition of these attributes (PasswordHistory, passwordAllowChangeTime and so on). A user entry can thus comprise these attributes without belonging to a particular object class. Operational password policy attributes are specific to an entry, non user-modifiable and usually computed based on password policy attributes.

According to the prior art, the values of password policy attributes are defined for all the entries of the DIT. More specifically a password policy configuration entry 311 of the DIT assigns values to password policy attributes. General configuration entries are stored under the "cn=config" entry.

The values of the password policy attributes defined in this configuration entry apply to all the user entries of the DIT, according to the subentry mechanism for scoping, defined in the ISO/IEC X.509 standard. As a result a single password policy is applicable whatever may be the user entry, which limits password mechanism controls.

Particularly, it is not possible to define specific password policy attribute values for a user according to his role or according to specific user information. The existing password policy lacks granularity for administrators who may need to apply different password policies depending on the specificity of a user.

A solution of the prior art would be to directly define the password policy attributes and attribute values in each user entry. This would require to further assign the passwordPolicy object class to each user entry. This solution would be extremely complicated to implement and to administer. Indeed, it would require defining as many password policy attributes values as existing user entries, and each time adding the passwordPolicy object class to the user entry.

Embodiment of the present invention comprise a password policy based on multiple password policy configuration entries, and not based on a single password policy configuration entry. In the prior art, the single password policy configuration entry defined under "cn=config" applies to any user entry, independently of the attributes comprised by the user entry, as "cn=config" is located at the root of the tree structure.

Figure 9:
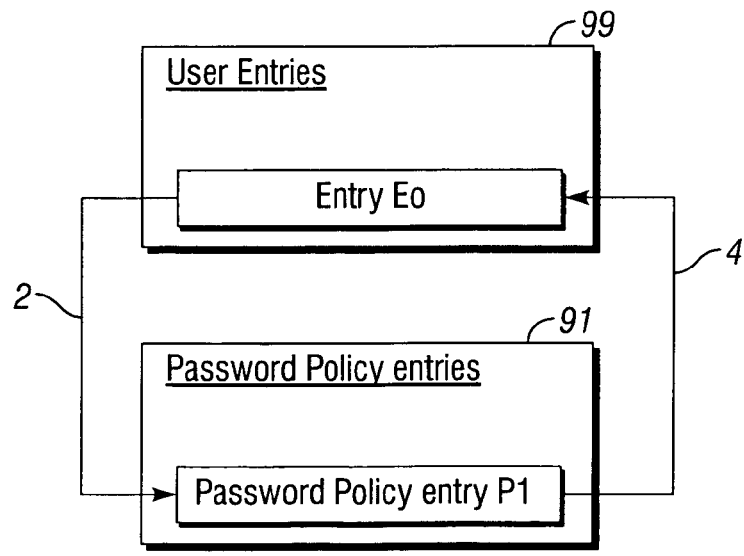
FIG. 9 shows a block diagram of an exemplary directory tree structure, in accordance with one embodiment of the present invention.

Referring now to FIG. 9, a block diagram of an exemplary directory tree structure, in accordance with one embodiment of the present invention, is shown. As depicted in FIG. 9, the directory tree structure comprises a set of password policy entries 91, each password policy entry defining a specific password policy. According to the invention, the directory server is capable of associating a given user entry E0 from user entries 991, with a particular password policy entry P1 from password policy entries 911, in order to apply the password policy defined by entry P1 to the user entry E0.

More specifically, user entries may be previously attached a special attribute identifying one of the password policy entries. As a result the directory server is operable for associating a given user entry E0 with a particular password policy entry P1 in response to the given user entry E0 comprising the special attribute, and to the special attribute identifying the password policy entry P1 (link 2). Moreover, the directory server is also operable for executing password policy checkings based on the values of the password policy attributes defined in entry P1, in response to the user entry E0 being identified (link 4).

In a first embodiment of the invention, the special password policy attribute, hereinafter named PasswordPolicySubentry, is an operational one, and therefore is not associated with an object class in the schema. As a result, any user entry may be added to this special attribute independently of the object classes to which the user entry belongs.

According to another embodiment of the invention, the value of passwordPolicySubentry attribute has a distinguished name (DN) syntax. This DN corresponds to the distinguished name of one of the password policy entries and thus identifies the password policy attribute values to be used for executing password policy checkings.

Exhibit E5.1 comprises an example of PasswordPolicySubentry attribute definition, in the schema of iPlanet (now "Sun One") Directory server. An exemplary password policy entry is shown in Exhibit E4.1. A password policy entry, according to the invention, comprises: a distinguished name identifying the entry, e.g. "dn: pwp_1, <suffix>", the passwordPolicy object class ("object class: passwordPolicy"), a set of password policy attributes and attribute values, e.g. "PasswordMinAge :0". The set of password policy attribute and attribute values characterizes a password policy entry. The passwordPolicySubentry attribute is attached to user entries in order to identify an associated password policy entry and thus the password policy attributes values to apply to each user. Defining the password policy attribute values out of the user entry makes it easier for the administrator to add/modify or delete these values.

Figure 12:
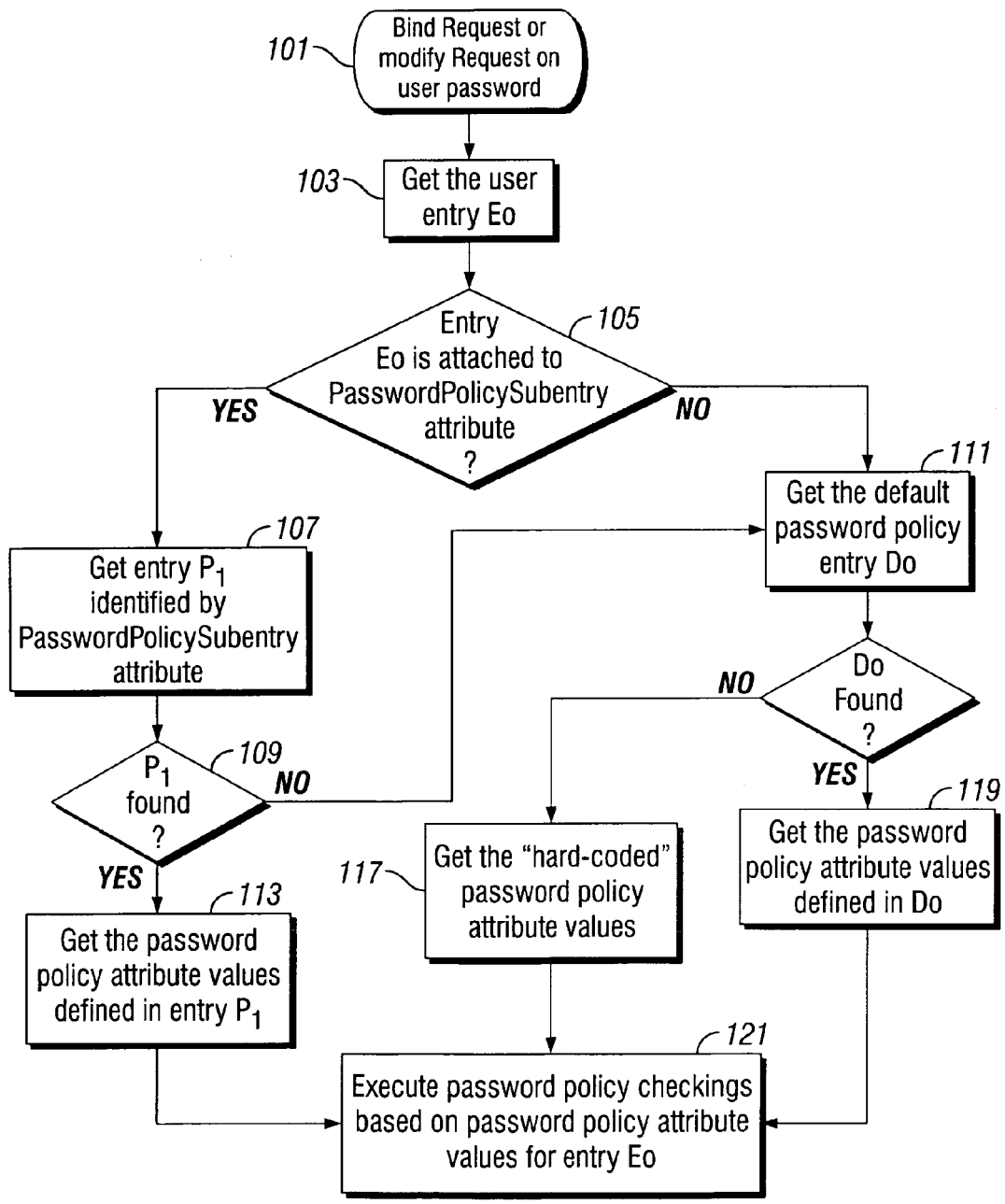
FIG. 12 shows a flow diagram of the operations performed by the directory server for executing the password policy checkings on a given user entry E0, in accordance with one embodiment of the present invention.

Referring now to FIG. 12, a flow diagram of the operations performed by the directory server for executing the password policy checkings on a given user entry E0, in accordance with one embodiment of the present invention, is shown. As depicted in FIG. 12, a binding request is received, at 101. In response to the bind request, or a modify request on a user's password attribute (UserPassword), the directory server gets the corresponding user entry E0, at 103. At 105, the directory server checks whether user entry E0 has the PasswordPolicySubentry attribute. If user entry E0 is attached to PasswordPolicySubentry attribute, the directory server gets the password policy entry P1, whose distinguished name is the value of PasswordPolicySubentry attribute, at 107.

If entry P1 exists (test 109), at 113, the directory server gets the password policy attributes values defined in entry P1. At 121, the server executes the password policy checkings based on the password policy attribute values obtained, at 113.

If entry E0 is not attached to PasswordPolicySubentry attribute (test 105) or if entry P1 does not exist in the DIT (test 109), at 111, the directory server gets a default password policy entry D0, defined in the configuration 311 under entry "cn=password policy, cn=config". This entry comprises predefined values for password policy attributes that are applicable to all the user entries. Exhibit E4.2 comprises an example of a default password policy entry.

If the default password policy entry D0 is not present, the directory server gets "hardcoded" password policy attributes values at 117. If the default password policy entry D0 is present, the directory server gets the password policy attributes values defined in this default entry, at 119. At 121, the directory server then executes password policy checkings based on the password policy attribute values obtained at 117 or 119.

In addition, the invention defines a mechanism for attaching PasswordPolicySubentry attribute and a specific value for that attribute to a user entry or to a set of user entries. This mechanism depends on whether PasswordPolicySubentry is real or generated by a class of service.

In an embodiment of this invention, PasswordPolicySubentry attribute is generated by a classic class of service based on the roles possessed by the user entry.

According to the prior art, a classic Class of Service is capable of generating attribute values for an entry based on the role possessed by the entry, which avoids generating the attribute values for each one of the entries of the role.

According to an embodiment of the invention, with reference to FIG. 10, the PasswordPolicySubentry attribute is generated as a role-based attribute. More specifically, cosAttribute in the CoS definition entry designates PasswordPolicySubentry and CoS template entries give values to PasswordPolicySubentry attribute. Thus, instead of directly attaching this attribute to user entries, PasswordPolicySubentry attribute is generated based on the roles possessed by user entry E0.

As PasswordPolicySubentry attribute is operational, the template entries 980 that generate this attribute are not added a special object class.

According to the prior art, generated attributes or role based-attributes are obtained using the nsrole attribute as the value of cosSpecifier attribute in the CoS Definition entry.

Referring now to FIG. 10, a block diagram of a role-based attribute, in accordance with one embodiment of the present invention, is shown. As depicted in FIG. 10, the role-based attribute is generated by the following operations of the prior art:

computing nsrole for a given target entry E0, from the roles 970 identified by nsrole, and from the cosTemplateDN value determining the CoS Template entry T1, getting in this CoS template entry T1 the value of the attribute identified by cosAttribute in the CoS Definition entry 940, and generating this value in the target entry E0.

According to the prior art, the role entries 970, the CoS definition entry 940, the template entry identified by cosTemplateDN attribute should be located in the same level in the directory tree.

Figure 11:
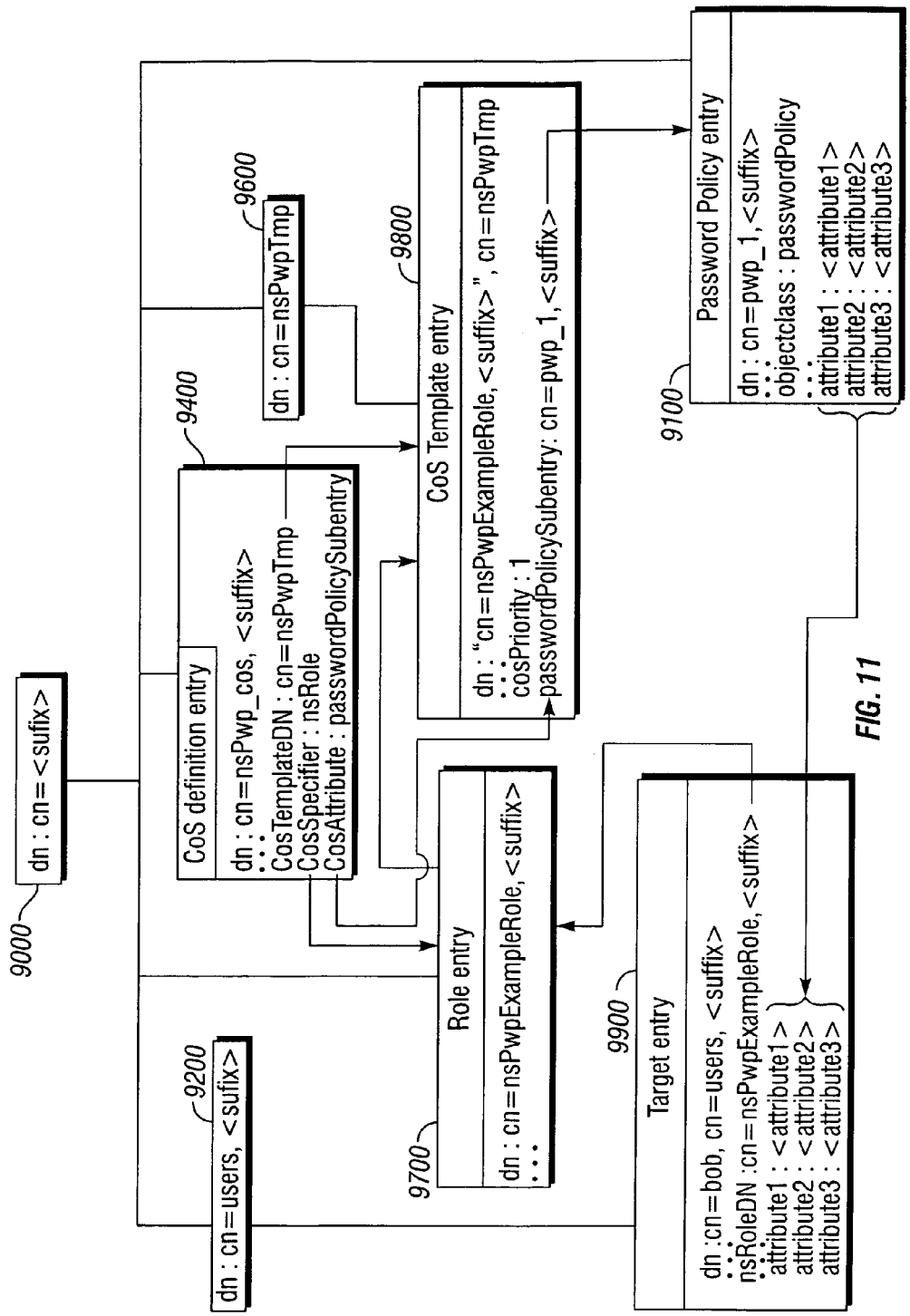
FIG. 11 shows a block diagram of an exemplary password policy entry attribute and attribute value, in accordance with one embodiment of the present invention.

Referring now to FIG. 11, a block diagram of an exemplary password policy entry attribute and attribute value, in accordance with one embodiment of the present invention, is shown. As depicted in FIG. 11, the tree structure represents an exemplary classic CoS generating PasswordPolicySubentry attribute and attribute value for a target entry. Exhibit E4.3 contains the LDIF definition of the represented entries.

The user entry 9900 "cn=rob" is a target entry of the class of service defined by the CoS definition entry 9400. The CoS attribute PasswordPolicySubentry ("cosAttribute=PasswordPolicySubentry") is generated as indicated by "CosSpecifier: nsRole". The user entry 9900 possesses the role entry 9700, as is indicated by "nsRoleDN: cn=nsPwpExampleRole, <suffix>". Thus, this role will be a value of nsrole attribute, when computing nsrole for entry 9900, according to the operations described above. The distinguished name of role 9700 "cn=nsPwpExampleRole, <suffix>" and the cosTemplateDN value "cn=nsPwpTmp" provide a distinguished name "cn=nsPwpExampleRole, <suffix>, cn=nsPwpTmp" that identifies the CoS template entry 9800.

The CoS attribute identifies the attribute PasswordPolicySubentry and the CoS template entry 9800 determines the value of this attribute "PasswordPolicySubentry: cn=pwp_1, <suffix>". PasswordPolicySubentry attribute and its value are then generated for the user entry 9900. Consequently, user entry 9900 is attached PasswordPolicySubentry attribute with the value "cn=pwp_1, <suffix>".

Referring now to FIG. 12, a flow diagram of a method for determining the password policy to apply to a user entry, in accordance with one embodiment of the present invention, is shown. As depicted in FIG. 12, the directory server determines the password policy to apply to user entry 9900. For example, with reference to FIG. 11, the directory server may determine that the password policy entry 9100 identified by "cn=pwp_1, <suffix>" exists in the DIT, and therefore apply the value <attribute1>, <attribute2>, <attribute3> and so on, as password policy attribute values for executing password policy checkings.

According to the invention, the password policy entry P1 should be located at the same level as the role entries 970, the CoS definition entry 940 and the template entry, identified by cosTemplateDN attribute.

Defining PasswordPolicySubentry attribute as a role-based attribute makes it possible for the administrator to dynamically assign the same group of entries without actually modifying them, and to modify the desired password policy by changing a single entry (the CoS template entry).

In an alternative embodiment according to the invention, passwordPolicySubentry attribute is real. The administrator defines directly in the user entry the passwordPolicySubentry attribute and attribute value. An example of a user entry comprising a real passwordPolicySubentry attribute is shown in Exhibit E4.4.

Figure 13:
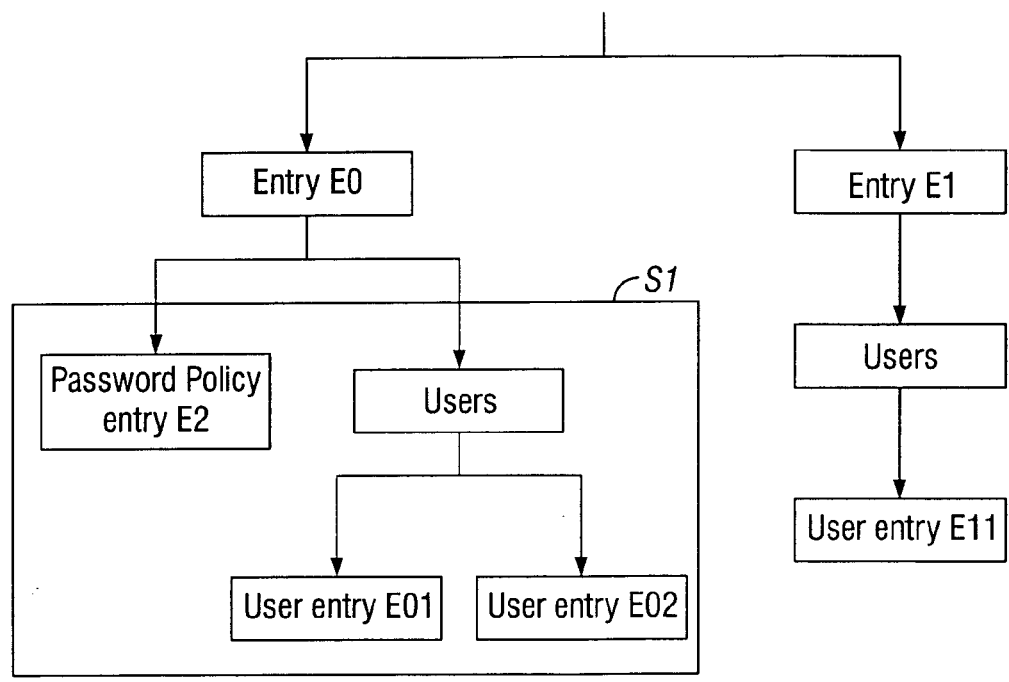
FIG. 13 shows a block diagram of a subentry mechanism for scoping, in accordance with one embodiment of the present invention.

According to this embodiment, a user entry associated with a password policy entry should be located in the scope of that entry, which is defined as the subtree of the parent entry of the password policy entry. Referring now to FIG. 13, a block diagram of a subentry mechanism for scoping, in accordance with one embodiment of the present invention, is shown. As depicted in FIG. 13, the subentry mechanism for scoping is defined in the ISO/IEC X.509 standard. User entries E01 and E02 are in the scope S1 of the password policy entry P1, and therefore can be associated with this entry. Inversely, user entry E11 is out of the scope of password policy entry P1 and therefore cannot be associated with entry P1.

Consequently, with reference to the flowchart of FIG. 12, operation 109 further comprises determining whether the user entry E0 is in the scope of the password policy entry P1, and if not, getting the default password policy entry at operation 111.

According to this embodiment, the administrator has to modify every single entry to add passwordPolicySubentry attribute and attribute value.

Additionally, the passwordPolicySubentry attribute must be controlled by an Access Control Instruction (ACI) in order to prevent an unauthorized user from modifying this attribute. An example of ACI is shown in Exhibit E5.2.

In the prior art, the password policy configuration was stored under "cn=config". As a result, it was not replicated and had to be the same on all the replicas. According to the invention, there is no more one global configuration for all the entries. The password policy may be entry-based or role-based and thus may be replicated. As for the default password policy entry that may be stored under "cn=password policy, cn=config", it should be the same on all the replicas.

According to another embodiment of the invention, the password policy configuration data from "cn=config" of the prior art may be migrated in the default password policy entry.

This invention also encompasses software code, especially when made available on any appropriate computer-readable medium. The expression "computer-readable medium" includes a storage medium such as magnetic or optic, as well as a transmission medium such as a digital or analog signal. Such software code may include data and/or metadata. This invention further encompasses the software code to be added to existing directory server functionalities to perform anyone of the various new functionalities, as described above, which may be used independently of each other.

The foregoing descriptions of specific embodiments of the present invention have been presented for purposes of illustration and description. A number of features have been positively described, using absolute language, to help understanding the LDAP example. Each such feature should be considered as exemplary only. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Exhibit E1—Password Policy Attributes Password policy attributes belongs to passwordPolicy object class. Their values indicates the parameters for determining when and how a user can/must change his password. The following sections E1.1 to E1.11 describe the main password policy attributes.

b 1.2—PasswordMaxAge

This attribute holds the number of seconds after which a modified password will expire. If this attribute is not present, or if the value is 0 the password does not expire.

E1.3—PasswordExp

ON means that the passwordExpirationTime must be updated after a successful password modification (i.e., password expiration is set).

1.4—PasswordMinLength

This attribute holds the minimum number of characters that must be used in a password, if syntax checking is enabled. If this attribute is not present, no minimum password length will be enforced.

1.5—PasswordInHistory

This attribute specifies the maximum number of used passwords stored in the passwordHistory attribute. If this attribute is not present, or if the value is 0, used passwords are not stored in the passwordHistory attribute and thus may be reused.

E1.6—PasswordChange

This attribute indicates whether users can change their own passwords. If this attribute is not present, a value of ON is assumed.

E1.7—PasswordWarning

This attribute specifies the maximum number of seconds before a password is due to expire that expiration warning messages will be returned to an authenticating user. If this attribute is not present, or if the value is 0 no warnings will be sent.

E1.8—PasswordCheckSyntax

This attribute indicates how the password syntax will be checked while being modified or added. If this attribute is not present, or if the value is OFF, syntax checking will not be enforced. A value of OFF indicates that the server will check the syntax. In fact, only the passwordMinLength is checked.

E1.9—PasswordMustChange

This attribute specifies with a value of ON that users must change their passwords when they first bind to the directory after a password is set or reset by the administrator. If this attribute is not present, or if the value is OFF, users are not required to change their password upon binding after the administrator sets or resets the password.

E1.10—PasswordStorageScheme

This attribute holds the schema tag name used to hash the userPassword attribute.

E1.11—PasswordMinAge

This attribute holds the number of seconds that must elapse between modifications to the password. If this attribute is not present, 0 seconds is assumed.

Exhibit E2—Lockout Policy Attributes

E2.1—PasswordLockout

This attribute indicates, when its value is "ON", that users will be locked out of the directory after a specified number of consecutive failed bind attempts. The maximum number of consecutive failed bind attempts is specified in passwordMaxFailure. If this attribute is not present, or if the value is "OFF", the account will not be locked when the number of failed bind attempts has been reached.

E2.2—PasswordMaxFailure

This attribute specifies the number of consecutive failed bind attempts after which a users account will be locked. If this attribute is not present, or if the value is 0, the account will not be locked due to failed bind attempts and the value of passwordLockoutDuration will be ignored.

E2.3—PasswordResetFailureCount

This attribute holds the number of seconds after which the password failures are purged from the failure counter (=passwordRetryCount), even though no successful authentication occurred. If this attribute is not present, or if its value is 0, the failure counter is only reset by a successful authentication.

E2.4—passwordLockoutDuration

This attribute holds the number of seconds that an account will remain locked due to too many failed bind attempts. If this attribute is not present, or if the value is 0 the account will be locked until reset by an administrator.

E2.5—PasswordUnlock

If passwordMaxFailure has been reached and the value of this attribute is OFF, it means that the account is locked until the administrator resets it. If passwordMaxFailure has been reached and the value is ON, the account is locked for passwordLockoutDuration seconds. If accountUnlockTime is 0 and the value of this attribute is OFF, the account is locked until the administrator resets it.

Exhibit E3—Operational Password Policy Attributes

E3.1—PasswordHistory

This attribute holds a history of previously used passwords.

E3.2—PasswordAllowChangeTime

This attribute is used to specify the exact time after which the user is allowed to change his password.

E3.3—PasswordExpirationTime

This attribute is used to specify the exact time after which the user's password expires.

E3.4—PasswordExpWarned

This attribute contains the time when the password expiration warning was first sent to the client. The password will expire in the passwordWarning time.

E3.5—PasswordRetryCount

This attribute is used to count the number of consecutive failed attempts at entering the correct password.

E3.6—RetryCountResetTime

This attribute specifies the exact time after which the passwordRetryCount is reset.

E3.7—AccountUnlockTime

This attribute refers to the exact time after which the entry can be used for authentication.

Exhibit E4—Entry Definitions According to the Invention

E4.1—Password Policy Entry dn: cn=pwp_1,<suffix>
objectclass: top
objectclass: passwordPolicy
objectclass: LDAPsubentry
passwordMinAge: 0
passwordMaxAge: 8640000
<attributes of passwordPolicy objectclass>

E4.2—Default Password Policy Entry dn: cn=Password Policy,cn=config
objectclass: top
cn: Password Policy
objectclass: passwordPolicy
PasswordMinAge: 0

PasswordMaxAge: 8640000
<attributes of passwordPolicy objectclass>
  E4.3—passwordPolicySubentry is Virtual: Roles/COS Entries
    E4.3.1—Role Entry
dn: cn=nsPwpExampleRole,<suffix>
objectclass: LDAPsubentry
objectclass: nsRoleDefinition
objectclass: nsSimpleRoleDefinition
objectclass: nsManagedRoleDefinition
cn: nsPwpExampleRole
    E4.3.2—CoS Template Entry Indicated by the Specifier
dn: cn=nsPwpTmp,<suffix>
objectclass: top
objectclass: nsContainer
    E4.3.3—CoS Template Entry Associated with Role cn=nsPwpExampleRole
dn:   cn=\"cn=nsPwpExampleRole,<suffix>\", cn=nsPwpTmp,<suffix>
objectclass: top
objectclass: extensibleObject
objectclass: costemplate
objectclass: 1dapsubentry
cosPriority: 1
passwordPolicySubentry: cn=pwp_1, <suffix>
    E4.3.4—CoS Definition Entry
dn: cn=nsPwp_cos,<suffix>
objectclass: top
objectclass: LDAPsubentry
objectclass: cosSuperDefinition
objectclass: cosClassicDefinition
cosTemplateDn: cn=nsPwpTmp,<suffix>
cosSpecifier: nsRole
cosAttribute: passwordPolicySubentry
  E4.4—passwordPolicySubentry Attribute is Real
dn: cn=users,<suffix>
objectclass: . . .
passwordPolicySubentry: cn=pwp_1, <suffix>

Exhibit E5—PasswordPolicySubentry Attribute
  E5.1—Definition in the Schema
    attributeTypes: (passwordPolicySubentryoid NAME 'passwordPolicySubentry' DESC 'iplanet defined password policy attribute type' SYNTAX 1.3.6.1.4.1.1466.115.121.1.12 X-ORIGIN 'iPlanet Directory Server' USAGE directoryOperation)
  E5.2—Access Control
    targetattr !=\"passwordPolicySubentry\")(version 3.0; acl\"" "Allow self entry modification except for passwordPolicySubentry" "allow (write)userdn=\"1dap:\\\self\";)";

What is claimed is:
1. A method of implementing a password checking function based on password-related data in a directory server system comprising:
  organizing a plurality of user entries in a tree structure;
  creating an additional entry, having attached password-related data;
  attaching extra data to a given user entry, the extra data designating the additional entry; and
  upon a call of the password checking function for the given user entry, executing the password policy checking function for the given user entry based on the password-related data in the additional entry designated by the extra data of the given user entry.

2. The method of claim 1, wherein:
  the additional entry has a scope in the tree structure; and
  executing the password policy checking function is performed subject to the given user entry belonging to the scope of the additional entry.
3. The method of claim 2, wherein the scope of the additional entry comprises the subtree of the parent entry of that additional entry.
4. The method of claims 1, wherein the additional entry has at least one attribute, whose value contains password-related data.
5. The method of claim 4, wherein the value of said at least one attribute contains password policy data.
6. The method of claims 1, wherein creating an additional entry comprises attaching an object class data to an additional entry, said object class data identifying a predefined object class associated with said password-related data.
7. The method of claims 1, wherein attaching extra data to a given user entry further comprises checking whether the tree structure comprises the additional entry, as identified by the extra data.
8. The method of claim 2, wherein:
  creating an additional entry comprises creating a plurality of additional entries, each having attached password-related data, the additional entries having different scopes in the tree structure, and
  executing the password policy checking function is performed subject to the given user entry belonging to the scope of one of the additional entries.
9. The method as claimed in claim 8, further comprising:
  executing the password policy checking function on the given user entry, using predefined password related data, when the given user entry has no extra data associated thereto.
10. The method of claim 1, wherein the extra data designates the location of said additional entry.
11. The method of claim 1, wherein attaching extra data to a given user entry comprises directly adding the extra data to the given user entry.
12. The method of claim 11, wherein attaching extra data to a given user entry further comprises adding the extra data to the given user entry in the form of an extra data attribute whose value designates the location of the additional entry.
13. The method of claim 12, wherein the extra data attribute is an operational attribute.
14. The method of claim 1, wherein:
  the directory server has a class of service mechanism; and
  attaching extra data to a given user entry comprises adding the extra data in the form of a class of service being applicable to one or more user entries.
15. The method of claim 14, wherein a class of service has a scope and said one or more user entries are located in the scope of the class of service.
16. The method of claim 15, wherein the scope of a class of service comprises the entries located in the subtree of the parent entry of an entry defining the class of service.
17. The method of claims 14, wherein:
  the directory server has a role mechanism; and
  attaching extra data to a given user entry comprises adding the extra data to a class of service being applicable to one or more user entries having the same role.
18. The method of claims 14, wherein creating an additional entry comprises adding said additional entry in the same level of the tree as the entry defining the class of service.

19. A computer-readable medium containing a plurality of instructions which when executed cause a directory server to provide a method of configuring password policies in a directory server system comprising:

organizing a plurality of user entries in a directory information tree;

creating an additional user entry in said directory information tree; and attaching a given password policy to said additional user entry, wherein the password policy comprises;

an attribute attached to said additional user entry identifying said given password policy; and an attribute value comprising a password policy rule.

20. The computer-readable medium according to claim 19, wherein said attribute of said given password policy is operative and is not associated with an object class in a schema.

21. The computer-readable medium according to claim 19, wherein said attribute of said given password policy comprises a corresponding distinguished name syntax attached to said additional user entry.

22. The computer-readable medium according to claim 19, wherein said attribute of said given password policy is generated by a class of server.

23. The computer-readable medium according to claim 22, wherein said attribute value of said password policy is based on a role possessed by said user entry.

24. The computer-readable medium according to claim 19, wherein said password policy attribute is real.

25. The computer-readable medium according to claim 24, wherein said attribute and said attribute value are defined in said user entry.

26. A computer-readable medium containing a plurality of instructions which when executed cause a directory server to implement a password policy checking method comprising:

receiving a binding request;

retrieving a corresponding user entry;

determining if said corresponding user entry has a password policy subentry attribute;

retrieving a password policy entry corresponding to said password policy subentry attribute, if said user entry has said password policy subentry attribute;

determining if said password policy entry is present;

retrieving a password policy subentry attribute value, if said user entry has said password policy subentry attribute and if said password policy entry is present; and executing said password policy checking as a function of said password policy attribute value corresponding to said user entry, if said user entry has said password policy subentry attribute and if said password policy entry is present.

27. The computer-readable medium according to claim 26, further comprising:

retrieving a default password policy entry if said user entry does not have a password policy subentry attribute or if said password policy is not present;

determining if said default password policy entry is present, if said user entry does not have a password policy subentry attribute or if said password policy is not present;

retrieving a hard-coded password policy attribute value, if said user entry does not have a password policy subentry attribute or if said password policy is not present, and if said default password policy is not present; and executing said password policy checking as a function of said hard-coded password policy attribute value, if said user entry does not have a password policy subentry attribute or if said password policy is not present, and if said default password policy is not present.

28. The computer-readable medium according to claim 26, further comprising:

retrieving a default password policy entry if said user entry does not have a password policy subentry attribute or if said password policy is not present;

determining if said default password policy entry is present, if said user entry does not have a password policy subentry attribute or if said password policy is not present;

retrieving a default password policy attribute value, if said user entry does not have a password policy subentry attribute or if said password policy is not present, and if said default password policy is present; and executing said password policy checking as a function of said default password policy attribute value, if said user entry does not have a password policy subentry attribute or if said password policy is not present, and if said default password policy is present.

29. The computer-readable medium according to claim 28, further comprising:

retrieving a default password policy entry if said user entry does not have a password policy subentry attribute or if said password policy is not present;

determining if said default password policy entry is present, if said user entry does not have a password policy subentry attribute or if said password policy is not present;

retrieving a hard-coded password policy attribute value, if said user entry does not have a password policy subentry attribute or if said password policy is not present, and if said default password policy is not present; and executing said password policy checking as a function of said hard-coded password policy attribute value, if said user entry does not have a password policy subentry attribute or if said password policy is not present, and if said default password policy is not present.

* * * * *

UNITED STATES PATENT AND TRADEMARK OFFICE
CERTIFICATE OF CORRECTION

PATENT NO. : 7,165,182 B2  Page 1 of 1
APPLICATION NO. : 10/613846
DATED : January 16, 2007
INVENTOR(S) : Karine Excoffier It is certified that error appears in the above-identified patent and that said Letters Patent is hereby corrected as shown below:

On the Title page item (75) Inventors, replace "Robert Bryne" with --Robert Byrne--.

Signed and Sealed this

Tenth Day of April, 2007

JON W. DUDAS
*Director of the United States Patent and Trademark Office*